United States Patent
Wilson et al.

(10) Patent No.: US 9,174,518 B2
(45) Date of Patent: Nov. 3, 2015

(54) OMNIDIRECTIONAL GRIPPING SURFACE FOR SHEET MATERIALS

(71) Applicant: Geary W. Wilson, Edmond, OK (US)

(72) Inventors: Geary W. Wilson, Edmond, OK (US); Geary W. Wilson, II, Edmond, OK (US)

(*) Notice: Subject to any disclaimer, the term of this patent is extended or adjusted under 35 U.S.C. 154(b) by 197 days.

(21) Appl. No.: 13/926,528

(22) Filed: Jun. 25, 2013

(65) Prior Publication Data

US 2014/0373316 A1 Dec. 25, 2014

(51) Int. Cl.
| | |
|---|---|
| F16B 2/06 | (2006.01) |
| F16G 11/00 | (2006.01) |
| B60J 7/10 | (2006.01) |
| B63B 17/02 | (2006.01) |
| F16B 2/10 | (2006.01) |

(52) U.S. Cl.
CPC ............. B60J 7/104 (2013.01); B63B 17/02 (2013.01); F16B 2/10 (2013.01); *Y10T 24/44034* (2015.01); *Y10T 29/49826* (2015.01)

(58) Field of Classification Search
CPC ............. F16B 2/065; F16B 2/18; F16B 2/12; F16B 2/10; B42B 5/00; A41F 17/00; B60J 7/104; B63B 17/02
USPC .................................................. 24/514, 516
See application file for complete search history.

(56) References Cited

U.S. PATENT DOCUMENTS

| | | | |
|---|---|---|---|
| 18,632 A * | 11/1857 | Cushman | 24/516 |
| 969,695 A * | 9/1910 | Holsey | B66C 1/422 24/DIG. 22 |
| 3,162,914 A | 12/1964 | Ireland | |
| 3,177,542 A * | 4/1965 | James | 24/115 R |
| 3,656,212 A | 4/1972 | Velte | |
| 3,914,828 A * | 10/1975 | Noda | 24/504 |
| 4,097,169 A * | 6/1978 | Kelly | 403/391 |
| 4,170,995 A * | 10/1979 | Levine et al. | 604/180 |
| 4,733,988 A * | 3/1988 | Kelly | 403/373 |
| 4,823,707 A | 4/1989 | Salsbury et al. | |
| 5,031,956 A | 7/1991 | Hudgins | |
| 5,388,313 A * | 2/1995 | Cameron | 24/537 |
| 5,540,475 A | 7/1996 | Kersting et al. | |

(Continued)

OTHER PUBLICATIONS

Dickssportinggoods;"Coghlan's Tarp Clips"; retrieved on Jun. 12, 2013 from http://www.dickssportinggoods.com/product/index.jsp-?productId=12610960.

(Continued)

*Primary Examiner* — Robert J Sandy
*Assistant Examiner* — Rowland Do
(74) *Attorney, Agent, or Firm* — Robert H. Frantz

(57) ABSTRACT

A clamping device for attaching or holding a sheet material has an upper clamping surface on an upper jaw with a series of protuberances formed with at least a curved shape about a center of a sheet material clamp, and a lower clamping surface on a lower jaw member having a series of protuberances which mate with the upper clamping surface protuberances in a nesting manner, such that closing of the sheet material clamp brings the upper clamping surface and the lower clamping surfaces into a nesting juxtapositioned position, thereby capturing a sheet material between the surfaces using compression or crimping. The pattern of protuberances may be concentric circular protuberances, other closed geometric protuberances, or semi-circular with rounded or tapered ends to avoid presentation of a sharp edge to a clamped sheet material.

6 Claims, 5 Drawing Sheets

(56) References Cited

U.S. PATENT DOCUMENTS

| | | | | |
|---|---|---|---|---|
| D386,076 S | * | 11/1997 | Moore | D8/394 |
| 7,837,164 B1 | | 11/2010 | Getgood | |
| 7,996,963 B2 | * | 8/2011 | Cameron | 24/344 |
| D657,840 S | * | 4/2012 | Prieto | D22/108 |
| 8,771,231 B2 | * | 7/2014 | Makino et al. | 604/174 |
| 2002/0000027 A1 | * | 1/2002 | Andersen et al. | 24/535 |

OTHER PUBLICATIONS

Covrall; "CovrAll Waterproof Stretchable Covering System"; retrieved on Jun. 12, 2013 from http://covrall.com/CovrAll-Design.html.

Grainger; "Tarp Clips"; retrieved on Jun. 12, 2013 from http://www.grainger.com/Grainger/HIGHLAND-Tarp-Clips-21T116?gcl.

Lilweggie; "Lil Weggie Tarp Clips"; retrieved on Jun. 12, 2013 from http://www.lilweggie.com/mm5/merchant.mvc?Screen=CTGY&Store_C.

CO2CAMP; "NoGrommet"; retrieved on Jun. 12, 2013 from http://www.co2camp.com/wp-content/uploads/2009/08/NoGrommet.jpg.

Peko; "Tarp Clamps"; retrieved on Jun. 12, 2013 from http://www.pekoproducts.com/.

Grainger; "RHINO GRIP Tarp Clip"; retrieved on Jun. 12, 2013 from http://www.grainger.com/Grainger/RHINO-GRIP-Tarp-Clips-4JZC3?cm.

Gofastandlight; "Rubber Head Locking Clip and Clamp for Tarps"; retrieved on Jun. 12, 2013 from http://www.gofastandlight.com/Rubber-Head-Locking-Clip-and-Clamp-fo.

Homedepot; "StepSaver Jaws-Clip Tarp Clamp"; retrieved on Jun. 12, 2013 from http://www.homedepot.com/webapp/catalog/servlet/GenericApplicationError?storeId=10051&catalogId=10053&langId=-1.

Leevalley; "Tarp Clamps"; retrieved on Jun. 12, 2013 from http://www.leevalley.com/en/garden/page.aspx?p=45929&cat=2,33141&ap=1.

Gofastandlight; "Tarp Clamps Set of Two"; retrieved on Jun. 12, 2013 from http://www.gofastandlight.com/Tarp-Clamps-Set-of-Two/productinfo/T.

Flickr; "Tarp Clips Compared"; retrieved on Jun. 12, 2013 from http://www.flickr.com/photos/bfgreen/7168134714/.

Hamiltonmarine; "Tarp Clips Wedge Grip Style 746953"; retrieved on Jun. 12, 2013 from http://store.hamiltonmarine.com/browse.cfm/tarp-clips-wedge-grip-style-...1.

* cited by examiner

OMNIDIRECTIONAL GRIPPING SURFACE FOR SHEET MATERIALS

CROSS-REFERENCE TO RELATED APPLICATIONS

Claiming Benefit Under 35 U.S.C. 120

None.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The invention generally relates to devices and methods for attaching cords, ropes, and bungees to tarps, and more generally to devices for clamping sheet materials.

BACKGROUND OF INVENTION

There is a common need to attach a retention means such as a rope or bungee cord to a tarp in order to secure it in place, such as over a load on a trailer of a truck or over the top of a tractor or boat to protect it from the elements.

Possibly the most common attachment means for such a tarp are grommets which are installed through the tarp material. Grommets can, however, present a hazard to damaging the fine finish of a covered item, such as paint on an automobile, and are subject to tearing out. And, grommets may or may not be pre-placed at the best points of securing a tarp. Further, not all tarps are provided with grommets, and installing a grommet by an end-user requires special tools and supplies.

There is a wide variety of tarp clamps which essentially pinch or clip onto an edge of a tarp. Most are constructed of plastic, metal, or a combination of plastic and metal, and have some sort of means for opening the clamp, and then reclosing the clamp after the tarp or sheet material has been received into its clamping jaws. These types of devices are relatively inexpensive, can be positioned almost anywhere along the edge of a tarp as needed, and can be easily removed and re-used without a need for special tools or supplies.

SUMMARY OF EXEMPLARY

Embodiments of the Invention

A clamping device for attaching or holding a sheet material has an upper clamping surface on an upper jaw with a series of protuberances formed with at least a curved shape about a center of a sheet material clamp, and a lower clamping surface on a lower jaw member having a series of protuberances which mate with the upper clamping surface protuberances in a nesting manner, such that closing of the sheet material clamp brings the upper clamping surface and the lower clamping surfaces into a nesting juxtapositioned position, thereby capturing a sheet material between the surfaces using compression or crimping. The pattern of protuberances may be concentric circular protuberances, other closed geometric protuberances, or semi-circular with rounded or tapered ends to avoid presentation of a sharp edge to a clamped sheet material.

BRIEF DESCRIPTION OF THE DRAWINGS

The description set forth herein is illustrated by the several drawings.

DETAILED DESCRIPTION OF EXEMPLARY

Embodiment(s) of the Invention

Figure 1A:
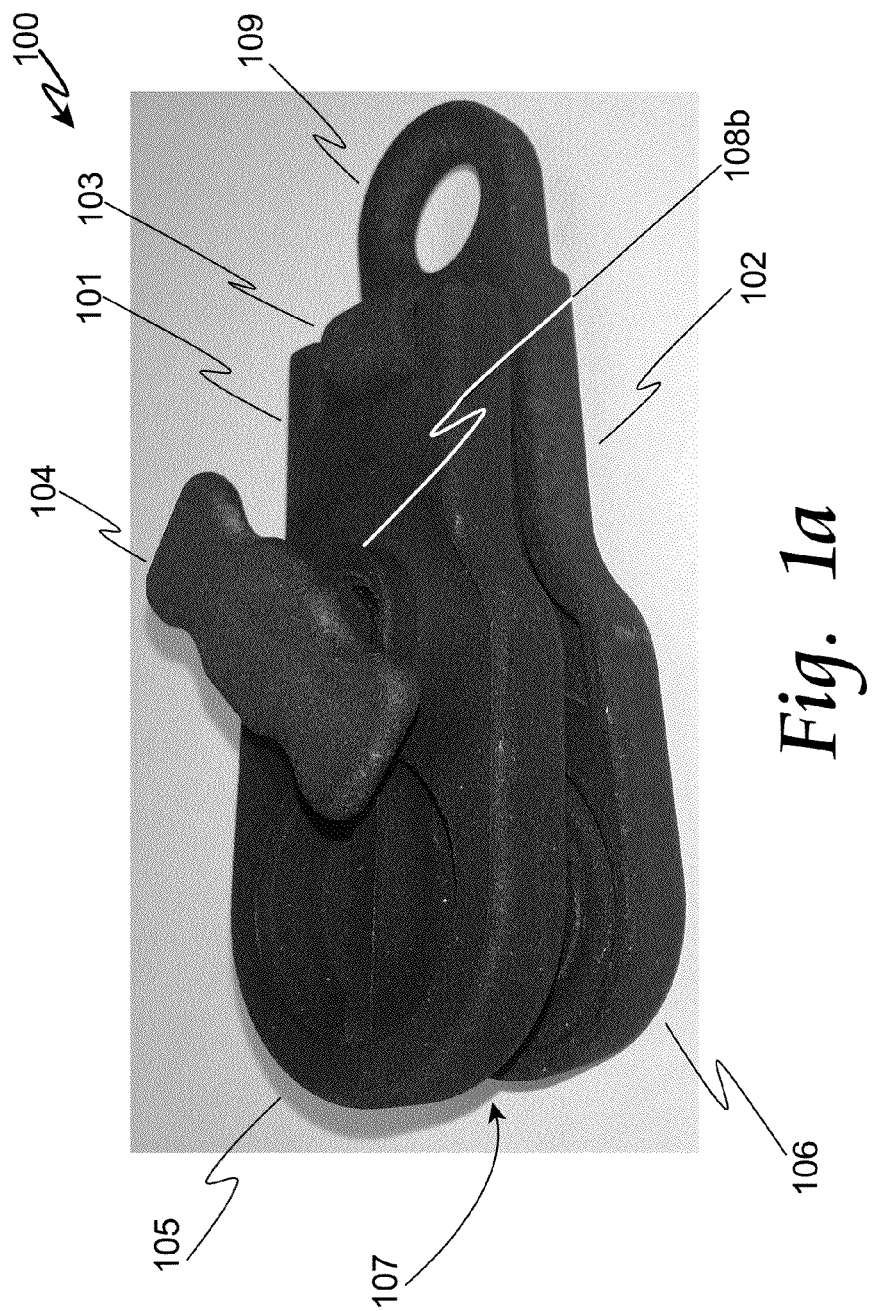
FIGS. 1a and 1b illustrate perspective views of a prototype tarp clamp according to the present invention.

The inventors of the present invention have realized several problems with the existing collection bins and bags in the art. Firstly, grommets are not end-user friendly if they are positioned in less-than-optimal positions, if they tear out, if they present a damage hazard to a covered item, or if they need to be installed.

Further, some tarp clamps present sharp edges to the tarp material. These clamps provide linear grooves or notches in their clamping area which may be of zig zag or tooth-like shapes when viewed in a cross section. When these clamps are installed on the edge of a tarp, the grooves or notches are oriented generally parallel to the edge of the tarp material. If a rope or cord is attached to the clamp and then the rope is pulled at an angle other than perpendicular to the direction of the grooves or notches (e.g. other than perpendicular to the edge of the tarp), then a rotational force (twisting) is applied by the clamp's gripping area to the surface and through the thickness of the tarp. This kind of force may be applied as the cord is attached, if the departure angle of the cord is other than perpendicular to the edge of the tarp, and this kind of force may be applied dynamically due to pressures on the tarp caused by wind and by shifting of the items under the tarp. Such repeated twisting eventually can lead to the sharp or harsh edges presented by the clamping surfaces to tear into and damage the tarp. This damage can cause failure of the tarp to keep rain and dust off the covered items, and may cause the clamp to tear free in more severe cases.

Therefore, the present inventors have realized that the clamping surfaces of tarp clamp need certain improvements for both performance and reliability with respect to twisting and pulling forces which can be applied by various securing and tie-down methods during practical use.

Additionally, the present inventors have realized that the various mechanisms used to secure tarp clamps in their closed position have certain shortcomings. Some which use a screw to actuate them may not allow the clamp to be opened all the way for cleaning or for gripping very thick sheets of material, and some provide the two clamping jaws in a single, integral piece of plastic which cannot be disassembled. Some of these designs also allow the screw to be easily withdrawn fully, leading to the possibility of losing the screw if a user is adjusting or installing a clamp along a roadside, in inclement weather, etc. Still others use a sort of slide lock or ratcheting lock which can be easy to operate, but may not be as secure and may not transmit as great of clamping force as the screw-operated designs. And, the slide lock and ratcheting lock designs may wear at certain points to become less effective over their useful lifespans.

Therefore, the present inventors have also realized that there is an unmet need in the art for an improved clamp actuating means which is less likely to be lost, which provides full clamping strength, and which performs consistently over the full lifecycle of the device.

Referring now to FIG. 1a, which shows a prototype (100) of a sheet material clamp according to the present invention. This view shows a clamp in an assembled state in an open position, ready to receive a sheet material such as a tarp. It has three components: a top jaw member (101), a lower jaw member (102), and an actuating screw (104) received in a first orifice (108b). In this prototype, which was designed and fabricated using a three-dimensional printer, the two jaws are realized as separate and separable pieces joined by a hinge (103). In some embodiments, they may be initially separate pieces which are permanently adjoined through snapping, gluing, welding, etc., and in other embodiments they may be formed integrally as one piece having both functions. The present inventors prefer the two-piece, separable embodiment because it allows for certain cleaning, assembly and packaging advantages, that latter of which will be described in following paragraphs.

This embodiment also shows a fixed eyelet (109) for receiving a rope, tie-down or bungee cord, which may in other embodiments be replaced with a swiveling eyelet, a clip, or other means for attaching to a rope, cord or tie-down. At the opposite ends of the clamp (100) from the eyelet (109) are the clamping ends (105, 106) of the jaws (101, 102), which present juxtapositioned to each other two clamping surfaces (107) which will be described in greater detail in the following paragraphs.

Figure 1B:
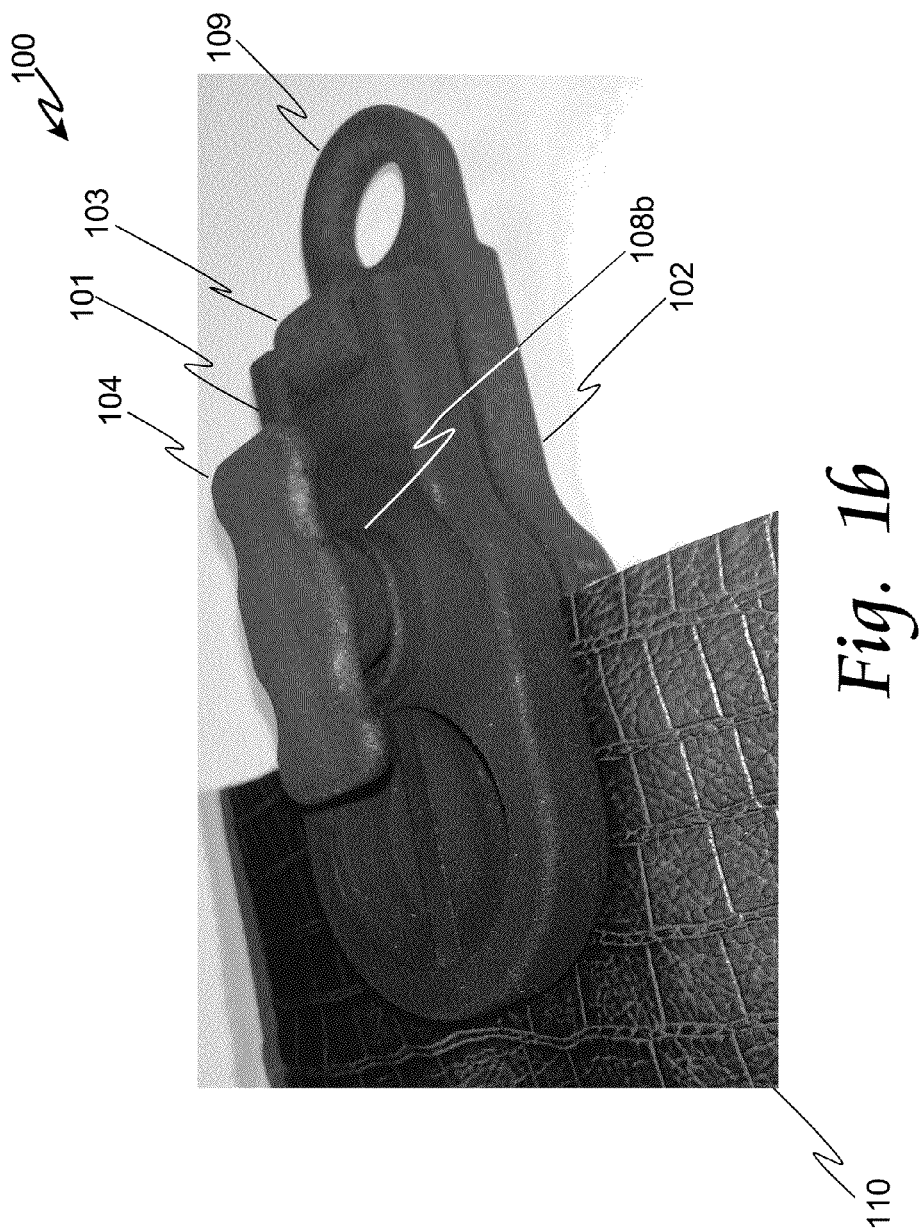

Referring now to FIG. 1b, the exemplary embodiment of FIG. 1a is shown in a closed and clamping position after the edge of a sheet material (110) has been received into its clamping area (107). To operate the clamp from the open position of FIG. 1a to the closed position of FIG. 1b, the sheet material (110), such as a tarp or a sail or other material, is maneuvered into the clamping area (107), and the actuating screw (104) is turned to close the jaws (101, 102) until they make contact with the material (110) and place it into a frictional bind between the jaws, thereby securing the clamp to the material and allowing the eyelet to be used to attach a tie-down means to the combination.

Figure 2:
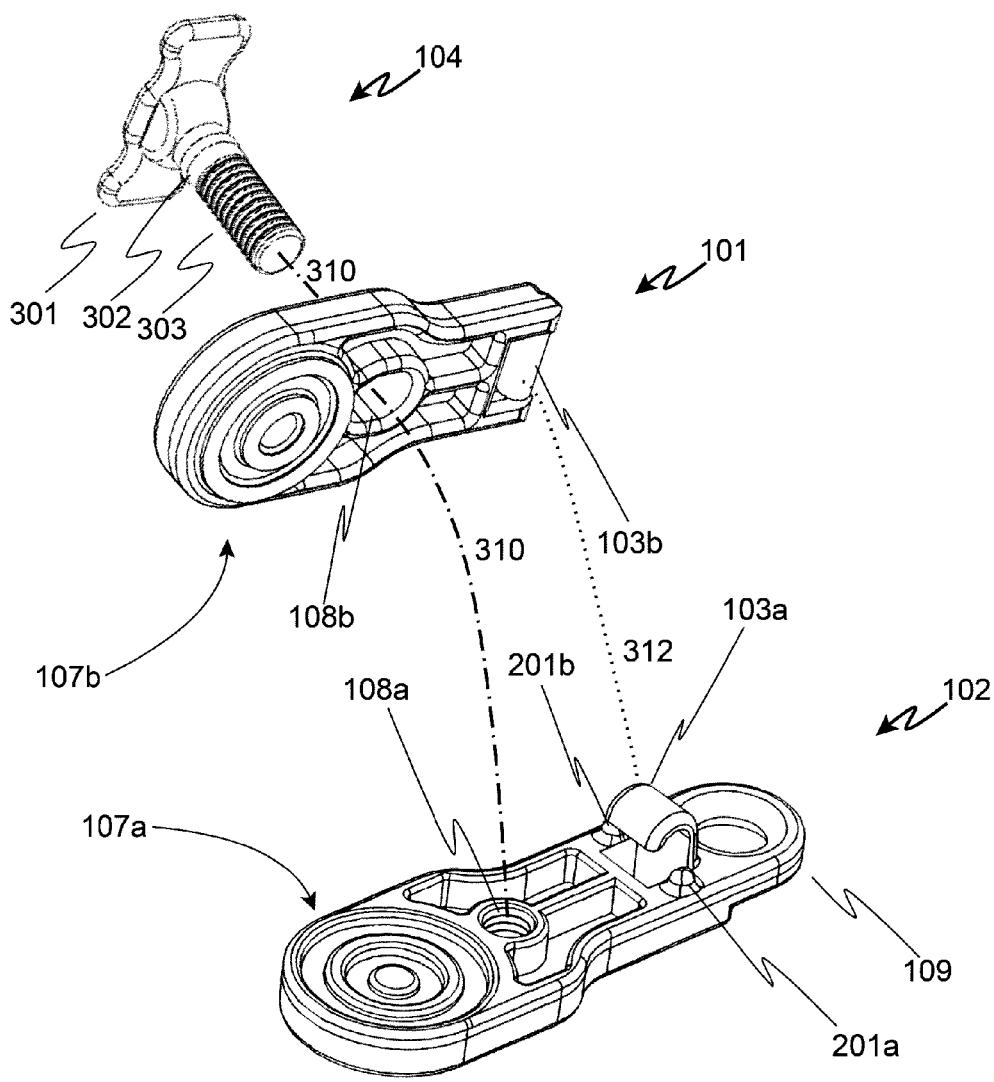
FIG. 2 provides an exploded view of the embodiment of FIGS. 1a and 1b.

Turning now to FIG. 2, an exploded view of the three components of the exemplary embodiment of FIGS. 1a and 1b is shown. More details of the clamping area (107) is shown in an upper clamping surface (107b) and a lower clamping surface (107a), which in this exemplary embodiment form nesting concave and convex concentric protuberances as shown. For example, a protruding (convex) ring shape on one surface will mate into a recessed (concave) ring shape in the opposite, juxtapositioned surface. The two clamping surfaces are designed with dimensions such that, when the clamp is fully closed, there may be a gap or space between opposing surfaces to accommodate a thickness of the tarp material.

Please note that the circular shapes of this clamping surface pattern provide an advantage over the devices currently available which provide linear, jagged teeth in their clamping surfaces. When the sheet material is clamped, and when a rotational, twisting force is applied to the clamp, this embodiment will present no harsh or sharp edges to damage the sheet material. Further, the circular clamping protuberances allow for some slippage rotationally, while still maintaining a grip to keep the clamp from pulling away from the edge of the tarp.

Other nesting shape combinations may be adopted for other embodiments, such as semi-circular protuberances having rounded or smoothed ends, and oval shaped protuberances (having no ends, of course).

To assemble, the clamp (100), the top jaw is maneuvered (312) so that the top hinge portion (103b) of the top jaw member (101) is received into the lower hinge portion (103a) of the lower jaw member (102) to form a hinge (103), and then the actuating screw (104) is installed (310) through an orifice (108b) in the top jaw (101) and threaded into a corresponding orifice (108a) in the lower jaw (102). The actuating screw preferably has a handle (301) to facilitate operation by hand, a retention portion (302), and a threaded shank (303), all of which will be described in further detail in the following paragraphs.

As the actuating screw is continued to be threaded into the orifice (108a) of the lower jaw, it comes in contact with an upper surface of the upper jaw (101) and begins to force the jaws towards each other, thereby beginning to close the clamp. If a sheet material is present between the clamping surfaces (107a, 107b), then as the clamp is further closed, the sheet material is bound and crimped by the mating opposing surfaces, and becomes secured captured by the clamp.

Hinge shoulders (201a, 201b) may be provided in order to cause the ends of the jaws near the hinge to be held further apart than the edges of the clamps farthest away from the hinge. As the screw is rotated to close the jaws, the motion of the jaws relative to each other will cause the edges of the clamping surface farthest away from the hinge to contact and bind the sheet material first, prior to the portions of the clamping surface which are closer to the hinge beginning to bind the tarp. Then, as the screw is rotated further, the jaws are drawn closer to each other in their center area, which causes the jaws to flex and bow towards each other, thereby closing the clamping surfaces together nearer the hinges.

Figure 3:
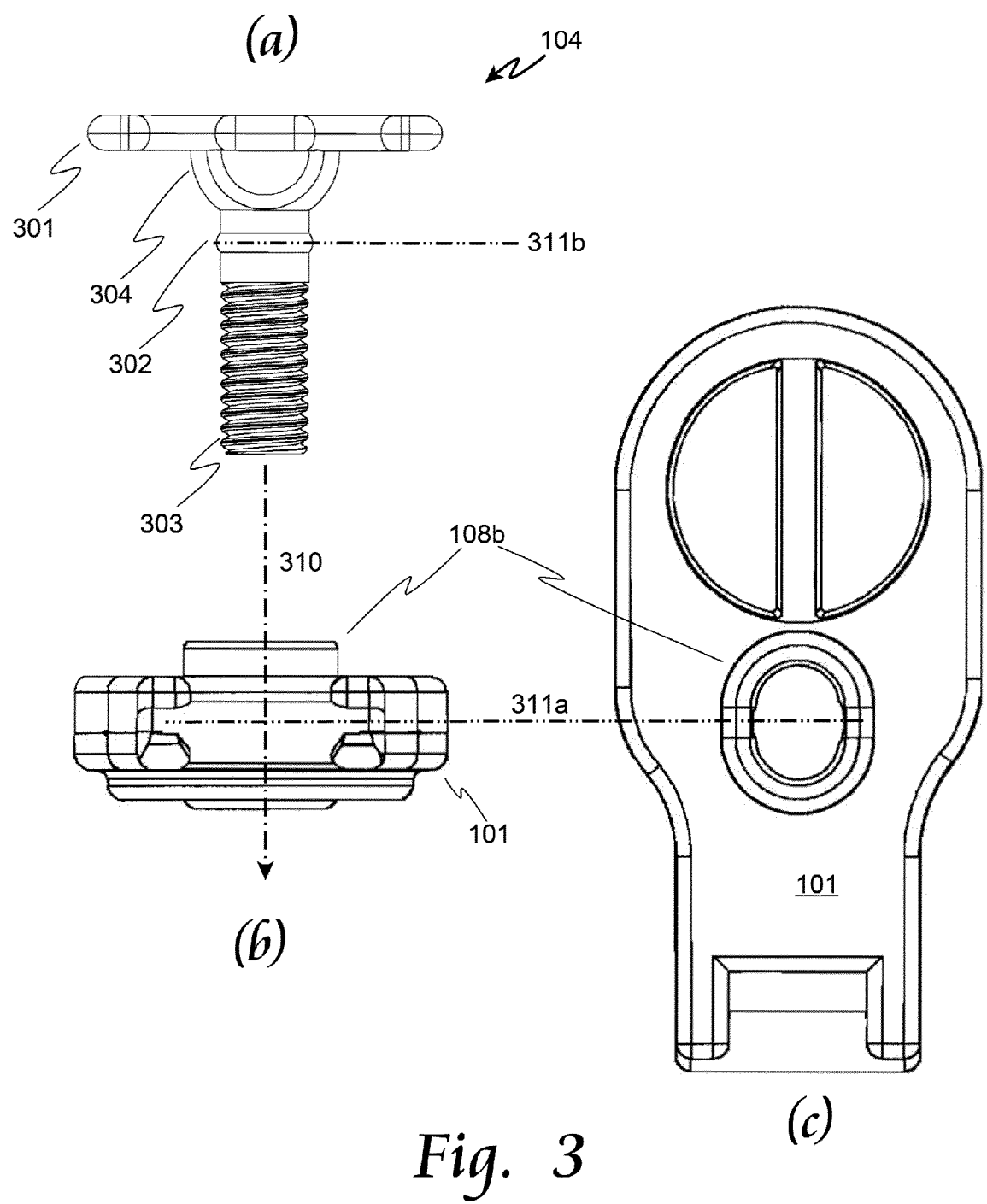
FIG. 3 sets forth details of an embodiment of the clamp of FIGS. 1a and 1b in which more details of a preferred mechanism to install and capture the actuating screw are shown.

Referring now to FIG. 3, the upper jaw (101) is shown (c) from a top view, in which the orifice (108b) is preferably formed as a slotted or oval-shaped void in the upper jaw (101). A corresponding cross-sectional view (b) shows a preferred embodiment of that orifice which includes an interior retention groove or annular channel (311a) formed around the periphery of the orifice (108b). The actuating screw (104) is shown (a) having a detente shoulder (304), a threaded shank portion (303), and a preferred retention area (304) which has a retention shoulder (311b) formed around it, suitably sized to be received in the retention groove (311a) of the orifice (108b) when the screw (104) is received (310) through the orifice (108b) during assembly and operation.

During assembly, the retention means (311a, 311b) is not yet engaged as the screw is not yet fully installed in the assembly. As the threads engage the lower orifice (108a) in the lower jaw member (102), it is pulled through the upper orifice (108b) until the retention shoulder (311b) reaches the upper material of the orifice (108b) rim. Then, as the screw is further turned, the retention shoulder (311b) is compressed and forced into the orifice (108b), eventually finding a home resting position by expanding into the retention groove (311a). Now, the screw (104) is captured by the upper jaw (101), and free to rotate clockwise or counterclockwise to tighten or open the clamp, respectively.

Figure 4:
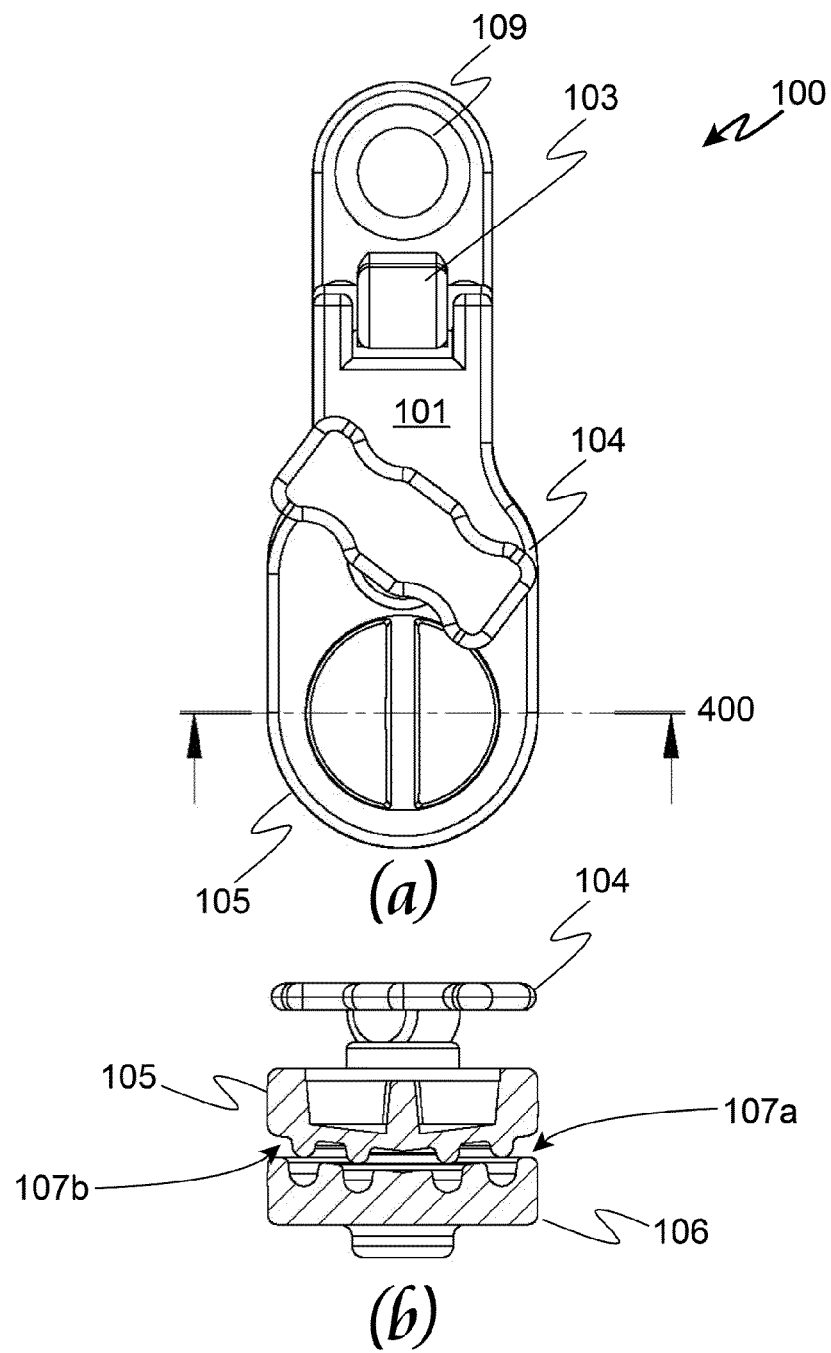
FIGS. 4a and 4b illustrate an optional aspect of the clamping surfaces including a top view and a cut-away view, respectively, in which the clamping surfaces are pre-loaded during the closing process.

Turning to FIG. 4, an optional advanced aspect of the clamping surfaces (107a, 107b) is shown. FIG. 4(a) is a top view of a clamp assembly (100) as previously described, having clamp jaw ends (105, 106) on the opposite end of the clamp (100) from the hinge (103). As shown in cut-away view (400) in FIG. 4(b), the upper clamping surface (107b) has a number of protuberances which nest downwards into corresponding recesses in the lower clamping surface (107a). While these nesting protuberances and recesses provide a good clamping surface for a sheet material, please note a further enhancement to the clamping structure in which one surface (the upper surface in this case) is slightly convex in shape (bowing downwards) such that the inner-most protuberances will contact the sheet material before the outermost protuberances. Similarly and correspondingly, the other surface (the lower surface in this case) is slightly concave in shape (also bowing downwards) such that the inner recesses are somewhat lower than the outer recesses. The structures can be reversed, of course, while maintaining the particular functional advantage of pre-loading the clamp as is it closed by biting on the innermost protuberances first, and the outermost protuberances last. During usage, if the sheet material and the clamp are pulled in a manner that would try to remove the material from the clamp in a direction through length of the jaws (e.g. a force from the eyelet towards the clamping surfaces), the flexing action of the pre-loaded jaws will cause the pulling motion to increase the clamping force in the areas of the clamping surfaces towards the hinge.

The clamping surfaces as shown in FIGS. 3 and 4 illustrate two concentric circles, which may be substituted for other non-linear shapes (e.g. curves, ovals, etc.) which have rounded or smoothed edges, and which may be greater in number (e.g. greater than two), or which may be as few as one (e.g. just a concave and a convex mating surface).

Another advantage of this particular embodiment is that it can be assembled and packaged in a single operation. For example, if one or more clamps are attached to a sheet of card stock for display and retail sales, the card stock can be pre-cut to include a hole for each actuating screw. Then, the lower jaw is placed beneath the card stock with the lower orifice (108a) aligned with the hole in the card stock, the upper jaw is positioned in alignment with the lower orifice and card stock hole above the lower jaw with the card stock between the jaws, and the actuating screw is then installed normally plus it passes through the card stock. As the screw snaps into place, the assembly of the clamp is completed simultaneously as the packaging of the product is completed.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A clamping device for attaching or holding a sheet material comprising:
    a first clamping surface on a first jaw member having a plurality of protuberances concentric about a first common center, wherein protrusion heights from the first clamping surface of protuberances closer to the common center are greater than protrusion heights of protuberances further from the first common center;
    a second clamping surface on a second jaw member having a plurality of recesses concentric about a second common center, wherein a depth and shape of each recess mates with a protuberance on the first clamping surface; and
    a pivoting hinge disposed between the first and second jaw members such that the first center aligns with the second center, the hinge providing an open position with the protuberances and recesses disengaged, and a closed position with the protuberances and recesses engaged into a mating nesting juxtapositioned position, wherein during transition between the open position and the closed position the protuberances closest to the first center engage the recesses closest to the second center prior to engagement of protuberances and recesses further from the first and second centers.

2. The clamping device as set forth in claim 1 wherein the protuberances and recesses are circularly shaped.

3. The clamping device as set forth in claim 1 wherein the protuberances and recesses are semi-circularly shaped.

4. A method for manufacturing a clamping device for attaching or holding a sheet material comprising:
    forming a first clamping surface on a first jaw member having a plurality of protuberances concentric about a first common center, wherein protrusion heights from the first clamping surface of protuberances closer to the common center are greater than protrusion heights of protuberances further from the first common center;
    forming a second clamping surface on a second jaw member having a plurality of recesses concentric about a second common center, wherein a depth and shape of each recess mates with a protuberance on the first clamping surface; and
    disposing a pivoting hinge between the first and second jaw members such that the first center aligns with the second center, the hinge providing an open position with the protuberances and recesses disengaged, and a closed position with the protuberances and recesses engaged into a mating nesting juxtapositioned position, wherein during transition between the open position and the closed position the protuberances closest to the first center engage the recesses closest to the second center prior to engagement of protuberances and recesses further from the first and second centers.

5. The method as set forth in claim 4 wherein the protuberances and recesses are formed in circular shapes.

6. The method as set forth in claim 4 wherein the protuberances and recesses are formed in semi-circular shapes.

* * * * *